(12) United States Patent
Koontz et al.

(10) Patent No.: US 10,901,094 B2
(45) Date of Patent: Jan. 26, 2021

(54) MULTI-MODE TRACKING DEVICE

(71) Applicant: RAYTHEON BLACKBIRD TECHNOLOGIES, INC., Waltham, MA (US)

(72) Inventors: Michael D. Koontz, Chantilly, VA (US); Andrew H. Tran, Herndon, VA (US); Eric A. Banwart, Ellicott City, MD (US); Steven T. Hildner, Leesburg, VA (US)

(73) Assignee: Raytheon Blackbird Technologies, Inc., Waltham, MA (US)

( * ) Notice: Subject to any disclaimer, the term of this patent is extended or adjusted under 35 U.S.C. 154(b) by 322 days.

(21) Appl. No.: 16/052,501

(22) Filed: Aug. 1, 2018

(65) Prior Publication Data

US 2019/0049592 A1    Feb. 14, 2019

Related U.S. Application Data

(60) Provisional application No. 62/543,350, filed on Aug. 9, 2017.

(51) Int. Cl.
*G01S 19/26* (2010.01)
*G01S 3/20* (2006.01)
(Continued)

(52) U.S. Cl.
CPC ............. *G01S 19/26* (2013.01); *G01S 3/14* (2013.01); *G01S 3/20* (2013.01); *H01Q 1/24* (2013.01);
(Continued)

(58) Field of Classification Search
CPC ... G01S 19/26; G01S 3/14; G01S 3/20; G01S 3/046; G01S 5/0072; H04B 7/18504; H04B 7/1517; H01Q 1/24
See application file for complete search history.

(56) References Cited

U.S. PATENT DOCUMENTS 9,836,049 B1 * 12/2017 Tu .................... G05D 1/0088
2001/0020216 A1 * 9/2001 Lin ...................... G01S 19/44
701/472
(Continued)

FOREIGN PATENT DOCUMENTS

WO    WO 2016/082091 A1    6/2016

OTHER PUBLICATIONS

General Dynamics Mission Systems: "AN/PRC-155 Networking Manpack Radios 2-channel networking radio with embedded encryption and GPS Common Core Radio Approach", Mar. 29, 2016, Retrieved from the Internet: URL:https://gdmissionsystems.com/-/media/General-Dynamics/C4ISR-Technologies/Radios/PDF/radios-prc-155-manpack-radio-datasheet.ashx?la=en&hash=029E223AF85F550C00F45DE41315A3EB3F7E254A [retrieved on Nov. 15, 2018] (2 pgs.).
(Continued)

*Primary Examiner* — Peter M Bythrow
(74) *Attorney, Agent, or Firm* — Lewis Roca Rothgerber Christie LLP (57) ABSTRACT

A multimode tracking device includes a line of site (LOS) antenna; an LOS modem for communicating with other multimode tracking devices and for measuring power of a received signal; a satellite antenna; a satellite modem for communicating with a satellite for receiving and sending text messages, data and commands to and from external devices including a tracking and locating system; a Bluetooth or WiFi Direct interface for communicating with external mobile devices; an inertia measurement unit for providing motion tracking information; a user interface for interfacing with a user; and a processor for generating and displaying a line of bearing to the target on the display, based on the measured power and the motion tracking information. The multimode tracking device tracks assets and personnel (Continued)

and sends/receives text messages, data and commands to/from external devices both over the horizon via the satellite and locally via the LOS modem.

13 Claims, 9 Drawing Sheets

(51) Int. Cl.
*G01S 3/14* (2006.01)
*H01Q 1/24* (2006.01)
*G01S 5/00* (2006.01)
*G01S 3/04* (2006.01)
*H04B 7/185* (2006.01)

(52) U.S. Cl.
CPC ............. *G01S 3/046* (2013.01); *G01S 5/0072* (2013.01); *H04B 7/18504* (2013.01); *H04B 7/18517* (2013.01)

(56) References Cited

U.S. PATENT DOCUMENTS

| | | | |
|---|---|---|---|
| 2002/0015439 A1* | 2/2002 | Kohli | G01S 19/47 375/148 |
| 2004/0070515 A1* | 4/2004 | Burkley | G01S 5/0289 340/8.1 |
| 2007/0005609 A1* | 1/2007 | Breed | B60N 2/2863 |
| 2007/0060045 A1 | 3/2007 | Prautzsch | |
| 2009/0009398 A1* | 1/2009 | Taylor | G01S 19/49 342/451 |
| 2013/0335273 A1* | 12/2013 | Pakzad | G01S 5/0072 342/458 |
| 2014/0349626 A1 | 11/2014 | Bishop, Jr. et al. | |
| 2016/0242000 A1* | 8/2016 | Venkatraman | H04W 4/08 |
| 2017/0069214 A1* | 3/2017 | Dupray | G08G 5/0013 |
| 2017/0242133 A1* | 8/2017 | Yilmaz | G01S 19/26 |
| 2017/0299724 A1* | 10/2017 | Hsu | G01S 19/08 |
| 2018/0017660 A1* | 1/2018 | Roquel | G01S 5/0257 |
| 2018/0156923 A1* | 6/2018 | Berclaz | G01S 19/31 |
| 2018/0319495 A1* | 11/2018 | Tu | H01Q 3/005 |
| 2019/0086553 A1* | 3/2019 | Faragher | G01S 19/246 |

OTHER PUBLICATIONS

General Dynamics Mission Systems: "How does the PRC-155 connect you?" Mar. 29, 2016, XP055524160, https://gadmissions-systems.com/radios/networking-radios/prc-155-manpack-radio/ Retrieved from the Internet: URL:https://gdmissionsystems.com/-/media/General-Dynamics/C4ISR-Technologies/Radios/Images/2016=manpack-prc-155-infographic.ashx [retrieved on Nov. 15, 2018] (1 pg.).

International Search Report for corresponding International Application No. PCT/US2018/045825, filed Aug. 8, 2018, International Search Report dated Nov. 16, 2018 and dated Dec. 11, 2018 (5 pgs.).

Written Opinion of the International Searching Authority for corresponding International Application No. PCT/US2018/045825, filed Aug. 8, 2018, Written Opinion of the Internatioinal Searching Authority dated Dec. 11, 2018 (12 pgs.).

\* cited by examiner

MULTI-MODE TRACKING DEVICE

CROSS-REFERENCE TO RELATED APPLICATIONS

This Patent Application claims the benefits of U.S. Provisional Patent Application Ser. No. 62/543,350, filed on Aug. 9, 2017 and entitled "Multi-Mode Blue Force Tracking Device," the entire content of which is hereby expressly incorporated by reference.

GOVERNMENT LICENSE RIGHTS

This invention was made with Government support. The Government has certain rights in the invention.

FIELD OF THE INVENTION

The disclosed invention generally relates to signal communication and target tracking, and more specifically to multi-mode tracking devices.

BACKGROUND

Wireless communications typically require line-of-sight and as a result, may be obstructed by objects, such as building, hills, trees and even the curvature of the Earth. A communications satellite relays the wireless signals around the curve of the Earth (or over obstructing objects) and therefore allows communication between longer distances on the Earth. Wireless communications may be accomplished through optical communication or through radio frequency (RF) communication. Many wireless applications use RF communication since it does not require line of sight. RF communications incorporate an RF transmitter and an RF receiver (or RF transceiver).

Line of sight (LOS) propagation is a characteristic of electromagnetic radiation (or acoustic wave propagation) in which, waves travel in a direct path from the source (transmitter) to the destination (receiver). Electromagnetic transmission includes light emissions traveling in a straight line, however, the rays or waves may be diffracted, refracted, reflected, or absorbed by the atmosphere and obstructions with material and generally cannot travel when obstructed by obstacles. For example, low-powered microwave transmitters can be foiled by tree branches, buildings, heavy rain or snow. Also, the presence of objects, even not in the direct line-of-sight, can cause diffraction effects that can disrupt radio transmissions.

Blue force (BF) tracking is a United States military term for a global positioning system (GPS)-enabled capability that provides military commanders and forces with location information about friendly and hostile forces. The capability provides a common depiction of the location of friendly forces and therefore is referred to as the blue force tracker. The capability is also useful in civilian applications such as vehicle and asset tracking, animal tracking, and personnel tracking while walking, jogging, hiking, biking, driving, flying, and boating.

SUMMARY

In some embodiments, the disclosed invention is a multimode tracking device that includes: a line of site (LOS) antenna; an LOS modem for communicating with other multimode tracking devices and for measuring power of a received signal, via the LOS antenna; a satellite antenna; a satellite modem for communicating with a satellite for receiving and sending text messages, data and commands to and from external devices including a tracking and locating (TTL) system, via the satellite antenna; a Bluetooth or WiFi Direct interface for communicating with external mobile devices; an inertia measurement unit (IMU) for providing motion tracking information; a user interface including a display for interfacing with a user; and a processor for generating and displaying a line of bearing to the target on the display, based on the measured power and the motion tracking information. The multimode tracking device tracks assets and personnel and sends/receives text messages, data and commands to/from external devices both over the horizon (OTH) via the satellite and locally via the LOS modem.

In some embodiments, the multimode tracking device further includes sensors/beacons including radio frequency (RF) transceivers to act as a relay device for data transmission between the external devices. In some embodiments, the multimode tracking device further includes a digital compass and a signal strength indicator, respective outputs of which are displayed on the display.

In some embodiments, the multimode tracking communicates with mobile device applications via the Bluetooth or WiFi Direct interface and may use Iridium short burst data (SBD) for OTH communications and the LOS modem uses industrial, scientific and medical (ISM)-band radio for LOS communications.

In some embodiments, when there is an obstruction between the multimode tracking device and an external device, the multimode tracking device uses an UAS for communication with the external device. In some embodiments, the multimode tracking device receives commands and configuration data for configuring the multimode tracking device, from the satellite via the satellite modem, from a mobile device via the Bluetooth or WiFi Direct interface, and/or from other multimode tracking devices via the LOS interface.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the disclosed invention is a handheld, multi-function, multi-mode tracking device for over the horizon (OTH) and line of site (LOS) communications. The device communicates with other devices through a LOS radio link and includes independent sensors/beacons with compatible embedded RF transceivers. This way, the device transmits, receives, and relays track, status, emergency call (e.g., 911), message and other data to a variety of different devices.

Figure 1:
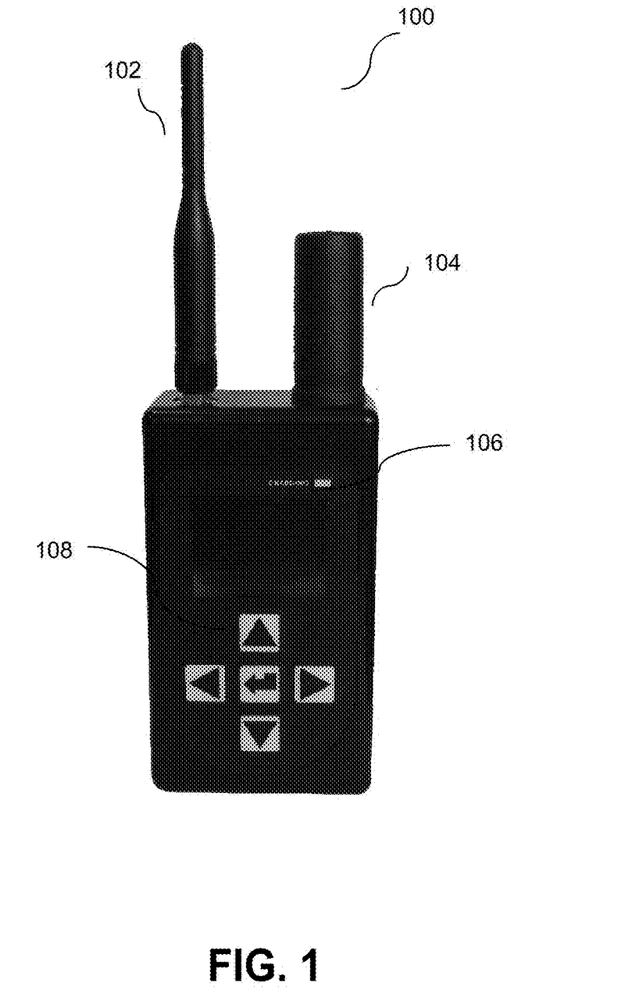
FIG. 1 shows a multi-function, multi-mode tracking (MMT) device, according to some embodiments of the disclosed invention.

FIG. 1 shows a multi-function, multi-mode transceiver (MMT) 100, according to some embodiments of the disclosed invention. In some embodiments, MMT 100 includes an ISM band LOS antenna 102, a satellite antenna 104, a display device 106 (e.g., liquid crystal display (LCD)), and different user input devices (e.g., buttons and/or keys) 108. In some embodiments, the display device 106 is a multi-color display that displays various data, information and user interactions with the MMT 100. A user can configure MMT settings and view data using the display device 106 and user input devices 108 (together referred to hereinafter as user interface). The user communicates with the MMT using commands, and views information about compatible external devices and sensors (e.g., device ID, device location, signal strength, battery status, etc.).

There are many ways external devices and sensors can be configure to communicate with the MMT. In some embodiments, the external devices and sensors can be configured by pairing with the MMT via Bluetooth. In some embodiments, the external devices and sensors can be configured by negotiating a secure link with the MMT via the LOS link using the Elliptic-curve Diffie-Hellman (ECDH) encryption standard. In some embodiments, the external devices can be configured using the satellite link, by pairing with a smartphone or tablet, or by using the USB connections. In some embodiments, any combination of the above approaches may be used to configure the external devices and sensors. Once configured, the MMT can send a request to the external devices asking for data. The MMT can also receive data sent by external devices (such as a beacon messages) without having to request for it.

In some embodiments, the MMT also includes a built-in digital compass and at least one signal strength indicator (for example, inside the MMT 100—not shown) that display their respective outputs on the display device 108. In some embodiments, the MMT is capable of connecting to various mobile device operating systems, such as Android™ or IOS™, via Bluetooth™ connections. The MMT augments traditional sat-com based Blue Force (BF) tracking with additional electronics to allow near real-time location data and point-to-point messaging to be shared by users within the same general geographic area.

The MMT 100 can operate with or without the companion mobile devices, such as smartphone, applications. It can also operate locally via the LOS link. Users of the MMT may be tracked over-the-horizon via satellites, for example, the Iridium™ satellite, by utilizing tagging, tracking and locating (TTL) systems. Additionally, the MMT has the ability to send messages to other devices, including other MMT devices, which are out of range of the LOS radio, by relaying them through a TTL system.

Figure 2A:
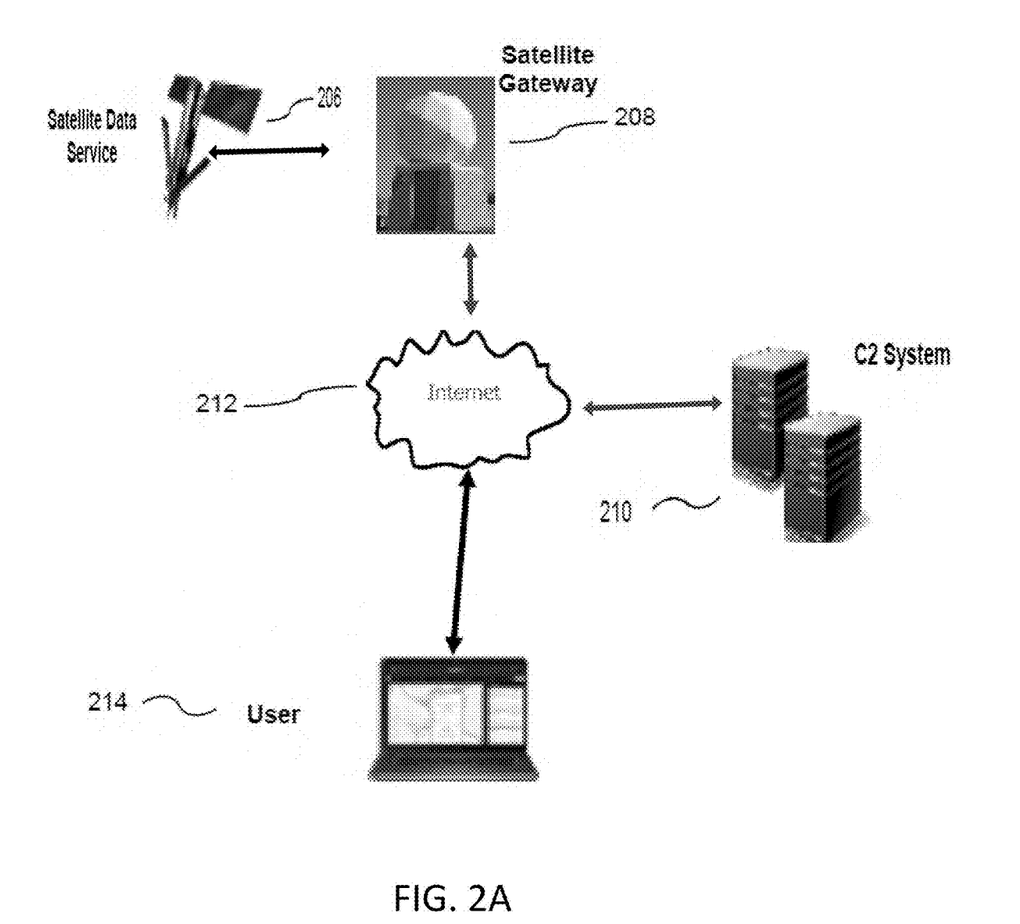
FIGS. 2A and 2B illustrate an exemplary operating environment for a MMT device, according to some embodiments of the disclosed invention.
Figure 2B:
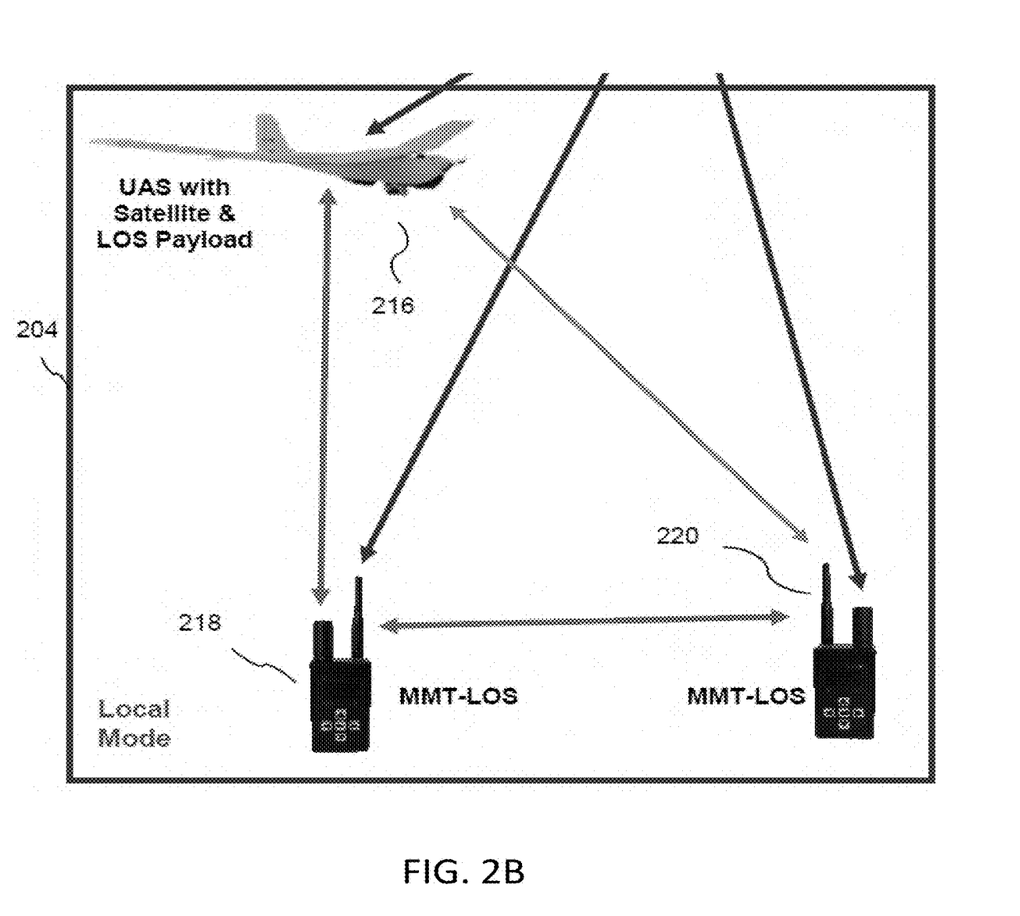

FIGS. 2A and 2B illustrate an exemplary operating environment for a MMT device, according to some embodiments of the disclosed invention. As depicted, the MMT has two modes of operation, an OTH mode and a local mode. FIG. 2A shows the OTH mode, while FIG. 2B illustrates the local mode. In some embodiments, the MMT uses Iridium short burst data (SBD) and industrial, scientific and medical (ISM)-band radio for OTH and LOS communications. The ISM radio bands are radio bands (portions of the radio spectrum) reserved internationally for the use of RF energy for industrial, scientific and medical purposes other than telecommunications. Examples of applications in these bands include radio-frequency process heating, microwave ovens, and medical diathermy machines.

In the OTH mode, a remote user 214 can log on to the TTL system (e.g., C2 system) 210 via the Internet 212 to send/receive messages to/from satellite (e.g., Iridium)-enabled devices 216, 218, and 220 (in FIG. 2B). The messages can be text, configuration, or any data messages. The TTL system 210 communicates with a satellite gateway 208 to queue messages to send to the satellite enabled devices 216, 218, and 220 and retrieve messages sent by the satellite enabled devices. The satellite gateway 208 interconnects the satellite 206 with the internet 212. The satellite gateway 208 also retrieves the messages queued by the TTL system 210 and send it to the satellites 206 and retrieves messages from the satellites 206 and send it to the TTL system 210.

When the satellite 206 receives the message from the satellite gateway 208, it stores that message into a mailbox associated with the specified recipient. Once an enabled device of the specified recipient connects to the satellite 206, it is able to send messages and retrieve messages from its mailbox in the satellite. As a result, the links to satellite 206 enable users of the MMT devices 218 and 220 and the TTL system user 214 to exchange short text messages and other data, and the TTL system user 214 can remotely reconfigure a MMT device or send commands to the MMT device via satellite 206.

In the local mode shown in FIG. 2B, the MMT devices can utilize the LOS link for communication when the satellite 206 is not available or communication via the satellite link is undesirable. The MMT device 218 can send message directly to the MMT device 220 or to an unmanned aerial system (UAS) 216. When MMT device 220 is out of reach of the MMT 218 due to distance or obstruction, MMT device 218 can use the UAS 216 for relaying the LOS message to the MMT device 220. This can be accomplished by the UAS 216 receiving the LOS message from the MMT 218 and re-transmitting that message to the MMT 220. Similarly, if the MMT device 220 is out of range of the UAS 216, the MMT device 220 can use the MMT device 218 to relay the message to the UAS 216. In some embodiments where the UAS 216 has a satellite link, the MMT devices 218, 220 can send the LOS message to the UAS 216 and have it relay the message back to the TTL system 210 using the satellite link.

In some embodiments, the MMT device 218 can act as a relay for other devices, including mobile phones and tablets. An external device can communicate with the MMT device 218 using Bluetooth™. When an external device sends a message over Bluetooth, the MMT 218 device can send that message over the satellite link or the LOS link to relay the message. The MMT device 218 can also pass the message received from MMT device 220 to the external devices. The message can be any type of format including text and data. In situations where an external device has cellular data coverage, the MMT device 218 can utilize the external device as a relay to exchange data between itself and the TTL system 210.

Figure 3:
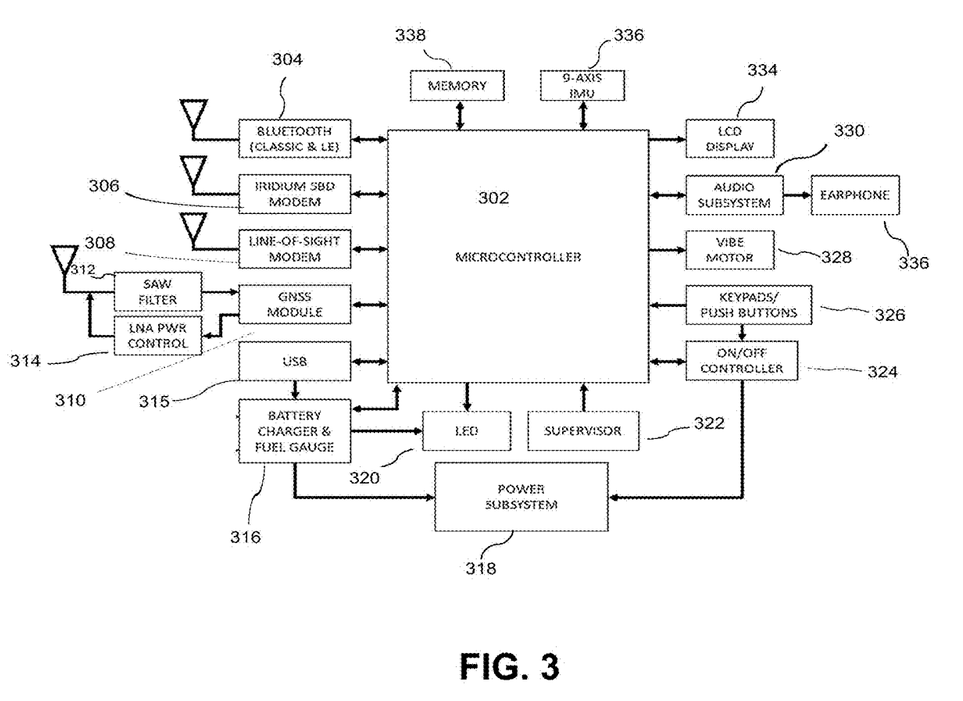
FIG. 3 depicts a simplified hardware block diagram for a MMT LOS handheld device, according to some embodiments of the disclosed invention.

FIG. 3 depicts a simplified hardware block diagram for a MMT LOS handheld device 300, according to some embodiments of the disclosed invention. As shown, the MMT device 300 includes a processor 302, such as a microcontroller, that provides a wide range of I/O interfaces to connect to various on-board peripherals. The processor 302 can be any suitable microprocessor, microcontroller, and/or processing device configured to perform any processing functions associated with the MMT device 300. The MMT LOS device 300 also include memory 338 such as EEPROM, MRAM and/or any suitable memory configured to store information associated with the device. An inertial measurement unit (IMU) device 336, for example, a 9-axis IMU provides motion tracking and includes a digital compass. IMU 336 can be any combination of separate accelerometer, magnetometer, and/or gyroscope or a single chip combining all those functions. A display 334 provides a large, easy to view, user interface for the device. Display 334 can be any suitable display configured to display information to the user. An audio subsystem 330 includes a filter, an audio amplifier (not shown) and an earphone 332. The audio filter can be any combination of filters including the reconstruction low pass filter and anti-alias filter. The volume output of the audio amplifier can be dynamically controlled.

A vibration motor 328 provides feedback to the user. Keypads and/or push buttons 326 allow for a direct and local interaction between the user and the device. Keypads and/or push buttons 326 can be any type of user input device including physical keypads, push buttons, and software buttons. An On/Off controller 324 provides the ability to turn on or off the device using the keypads and/or software control, or even remotely. The On/Off controller 324 can be activated by a single button or a combination of buttons, and it has the ability to lock the button to prevent user activation. A supervisor circuitry 322 includes a combination of voltage monitor and watch dog timer to monitor system parameters and reset the device if the system locks up or the voltage drops below an acceptable value.

A multi-purpose indicator 320, for example an LED, is controlled by the microcontroller and/or a battery charger and fuel gauge subsystem 316. The battery charger and fuel gauge subsystem 316 monitors and charges a battery. A high speed USB connection 315 allows the MMT LOS handheld device 300 to connect to a computer for configuration, firmware update, data transmission, and other tasks.

Additionally, the MMT LOS handheld device 300 include a multi-global navigation satellite system (GNSS) 310 for locational awareness. The GNSS 310 includes a power control circuitry 314 for external low noise amplifiers (LNA) as well as a saw filter 312 to improve the selectivity of the front-end. For example, if the adjacent channel transmits a high power signal, the SAW filter will reduce or eliminate the interference signal and only pass the GPS signal. A Bluetooth or WiFi Direct module 304 allows the MMT device to pair to external devices such as a smart phone or tablet. In some embodiments, the MMT device can operate in both classic mode and low energy mode and support various profiles for connection to other devices, such as iOS™ devices. An alternate or complementary implementation to using Bluetooth connection is to utilize WiFi Direct to communicate to the external devices.

In some embodiments, the MMT LOS handheld device 300 utilizes multiple RF transceiver modules to provide over-the-horizon data communications as well as interface to other devices. These RF transceiver modules include a satellite (e.g., Iridium) SBD modem 306 and an LOS modem 308. The satellite SBD modem 306 is a low data rate modem that provides an over-the-horizon, pole-to-pole data communication. Other implementations include the use an Iridium data modem or a long term evolution (LTE) modem for high data transmission.

In some embodiments, the MMT device tracks assets and personnel both over the horizon via a commercial satellite system, and locally via an ISM-band line-of-sight radio. The MMT device is capable of sending/receiving text messages to/from other devices (MMT device and other external systems/devices) both over the horizon via a commercial satellite system, and locally via an ISM-band line-of-sight radio. This way, the MMT device can locate personnel both over the horizon via a commercial satellite system, and locally via an ISM-band line-of-sight radio.

In some embodiments, to reduce the time required to recover a person under duress, the MMT device provides several interfaces (graphical map, audible tones, other graphical indicators) to guide operators to the correct location. The MMT device is also capable of interoperating with an UAS payload providing an expanded search area. One skilled in the art would recognize that not all of the components depicted in FIG. 3 are essential to the implementation and workings of a MMT device. Rather, a subset of these components such as, an LOS modem, a satellite modem, a Bluetooth or WiFi Direct interface, a user interface and a processor, provide the essential functionality for the MMT device to function as intended, while some of the generic and known components such as battery, USB, audio functions, LEDS, filters, amplifiers and the like, may not be present in some embodiments.

Figure 4:
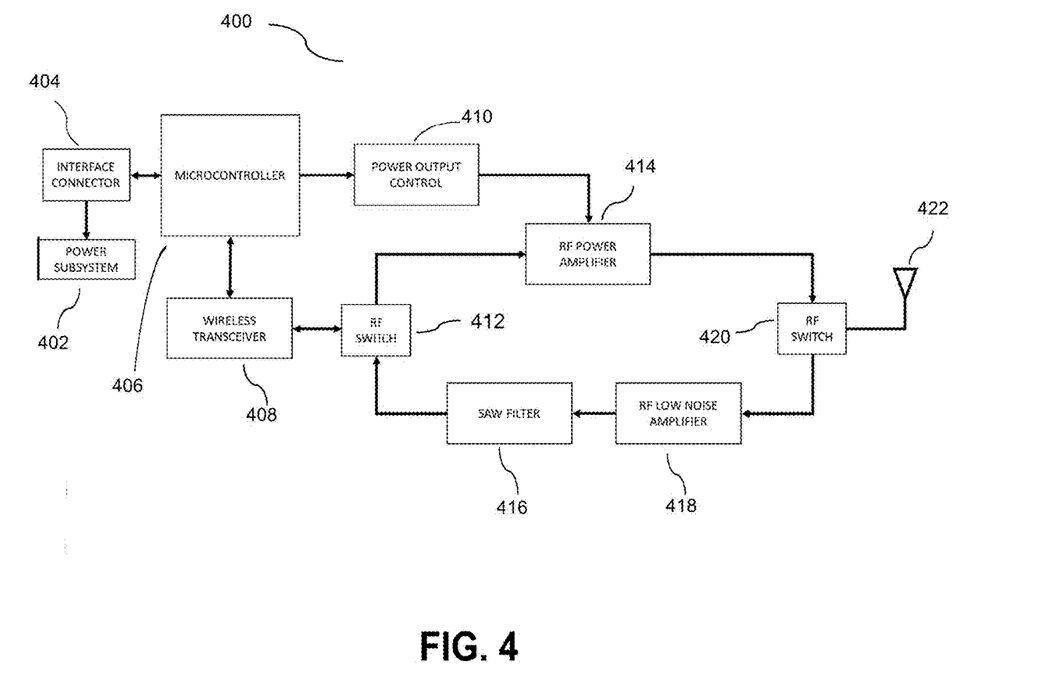
FIG. 4 shows a simplified hardware block diagram for a LOS modem, according to some embodiments of the disclosed invention.

FIG. 4 shows a simplified hardware block diagram for a LOS modem 400, according to some embodiments of the disclosed invention. In some embodiments, the LOS modem 400 is a high power, long range transceiver that allows MMT devices to communicate directly with one another. In some embodiments, the LOS modem is electrically coupled to the MMT LOS handheld device via an interface connector 404, which provides power (e.g., from a power subsystem 402), UART communication bus, and GPIOs. As shown, the LOS modem 400 includes a wireless (RF) transceiver 408 that provides long range spread spectrum communication, an RF power amplifier 414 for amplifying the RF signals, an RF low noise amplifier 418, and a SAW filter 416 to improve the overall system performance to achieve longer rage.

The output of the RF power amplifier 414 can by dynamically controlled by a processor or microcontroller 406 using the power output control circuitry 410. An RF switch 412 multiplexes the receive path and the transmit path to the wireless transceiver 408. Similarly, an RF switch 420 multiplexes the receive path and the transmit path to an antenna 422. When the LOS modem 400 transmits a message, the RF switches 412 and 420 switch to the transmit path, which includes the power amplifier 414. The power amplifier 414 is switched on to full power and the transceiver 408 transmits the message. When the LOS modem 400 is in receiving mode, the RF switches 412 and 420 switch to the receive path which includes the low noise amplifier 418 and the SAW filter 416.

In some embodiments, the LOS modem 400 is implemented in the MMT device, instead of as a separate module. In some embodiments, the LOS modem 400 can operate independently and physically separate from the MMT LOS handheld device 300. In these embodiments, the LOS modem 400 also include a multi-global navigation satellite system (GNSS) for locational awareness as well as an accelerometer for motion detection.

Figure 5:
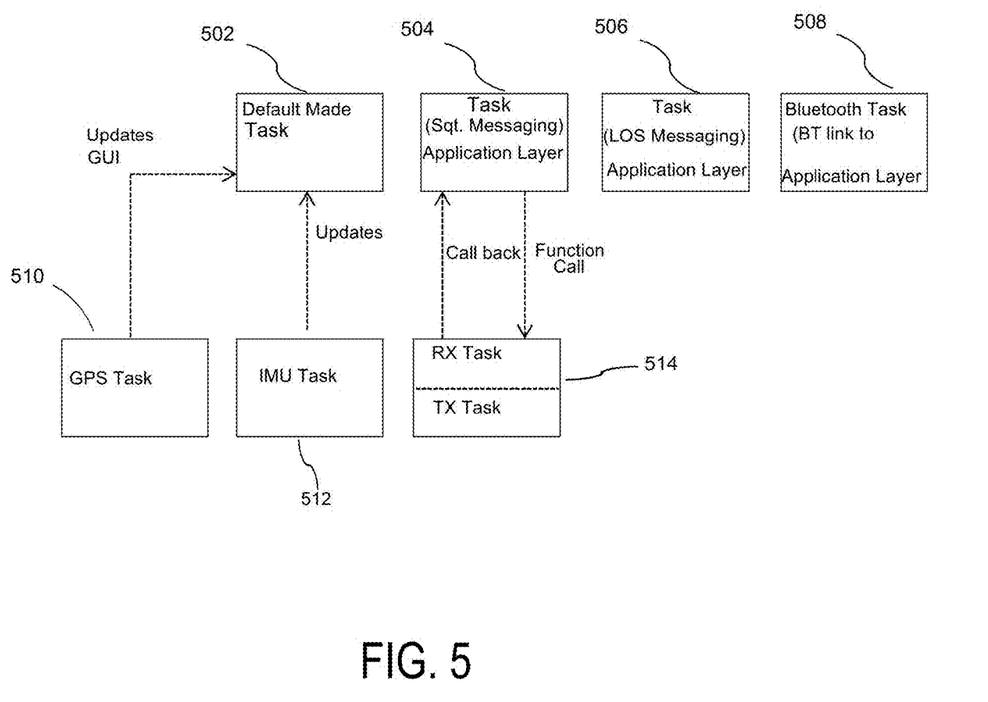
FIG. 5 illustrates exemplary operating modules of a MMT device, according to some embodiments of the disclosed invention.

FIG. 5 illustrates exemplary operating modules of a MMT device, according to some embodiments of the disclosed invention. As used herein, a module is a system element that receives digital numerical input and generates digital numerical output. The numerical input and output may be stored in a memory in the module. The module may be implemented in software, firmware, and hardware or in a combination thereof. In some embodiment, each module is a piece of firmware (e.g., a function, a subroutine, or an object) running on a processor executing instructions. As shown, the MMT device includes a default mode task module 502, a comms task module 504, a LOS task module 506, a Bluetooth task module 508, a GPS task module 510, an IMU task module 512 and a satellite (e.g., Iridium) transceiver task module 514.

In some embodiments, the default mode task module 502 is in the application layer of the software and is a free-running task that services user interface items, including handling button presses, updating the GUI, and updating battery status. Comms task module 504 may also be a free-running task that handles data passed to it from the satellite modem driver. Comms task module 504 also handles initiating satellite transmissions and pushing/displaying updated status of the satellite modem (e.g., signal strength, etc.) to the GUI. LOS task module 506 handles transmissions that are received over the LOS link. This is also the task that builds and handles transmission of any messages to be sent over the LOS link.

Bluetooth task module 508 services the Bluetooth module and is responsible for handling commands received over Bluetooth from smartphone applications and transmitting notification and messages over the Bluetooth to the smartphone applications. GPS task module 510 is responsible for ensuring the GPS receiver is running, and updating the current device location in the database, for example, every second. IMU task module 512 is responsible for handling calibration of the IMU. Once the IMU is calibrated, the IMU task module 512 is used to perform computations based on the raw sensor readings it receives from the IMU. The most used calculation is one that provides current heading of the receiver. In some embodiments, the IMU task module 512 also performs deduced reckoning, commonly referred to as "dead-reckoning", which is a process to estimate its current position in situations where GPS signal is unavailable. This process utilizes various sensors (e.g., IMU, vehicle speed, air speed, etc.) to calculate the current position based on the previous position even when GPS/GNSS position is difficult or impossible to obtain. The IMU task module 512 sends updates to the GUI and makes the updates available to calculate current offset from target line of bearing (described below).

In some embodiments, the data used by the MMT device includes configuration settings, stored inbound or outbound messages, contact lists of teammates, location information, and other information. Some of the data is nonvolatile and some data is stored in the storage/memory only while the device is running and as a way to allow different tasks to be able to use that data. For example, the GUI may need to show current location while the comms task module needs to use current location to build a message.

Figure 6:
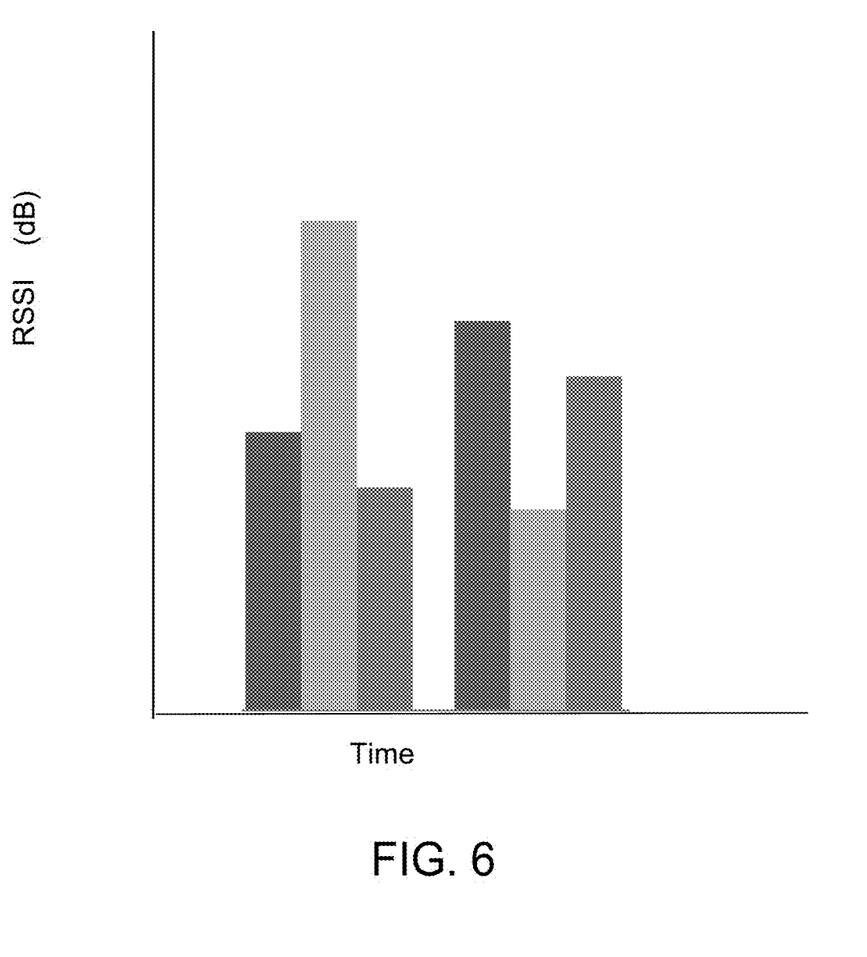
FIG. 6 depicts an exemplary graphical user interface (GUI), according to some embodiments of the disclosed invention.

FIG. 6 depicts an exemplary graphical user interface (GUI), according to some embodiments of the disclosed invention. In this example, the GUI illustrates a bar chart plot or a histogram on a time axis and a received signal strength indicator (RSSI) axis, which is a measurement of the power present in a received radio signal. Each bar depicts a signal received by the LOS modem from a target to be located, entering from the left of the plot and propagating to the right of the plot over time. The size of a bar indicates the signal strength. The RSSI calculated by the LOS modem and passed to application layer. If transmission included location data for target, an IMU is used to direct receiver to location of target (line of bearing). The user is directed to the correct line of bearing using a simple interface on a GUI similar to the one depicted in FIG. 8A.

In some embodiments, transmission is added to a rolling histogram on GUI. Histogram X axis indicates time and histogram Y axis indicates received signal strength indicator (RSSI). As shown, a larger bar means a stronger signal, where the oldest signals roll off to the right side of the histogram. The histogram allows a user to rotate through 360 degrees, which places an obstruction (their body) between the transmitter and receiver, lowering the RSSI when the user rotates off of the line of bearing. For example, the RSSI will be at the lowest value when the user is 180 degrees off from the line of bearing. Due to the body shielding effects, the user can read the RSSI graph and notice the signal strength changing while the user rotates through 360 degrees. From this effect, the user can estimate the line of bearing to the target by noticing which direction shows the highest RSSI value. In addition to the visual representation on the screen, an audible tone may be played for the user (through headphones).

Figure 7:
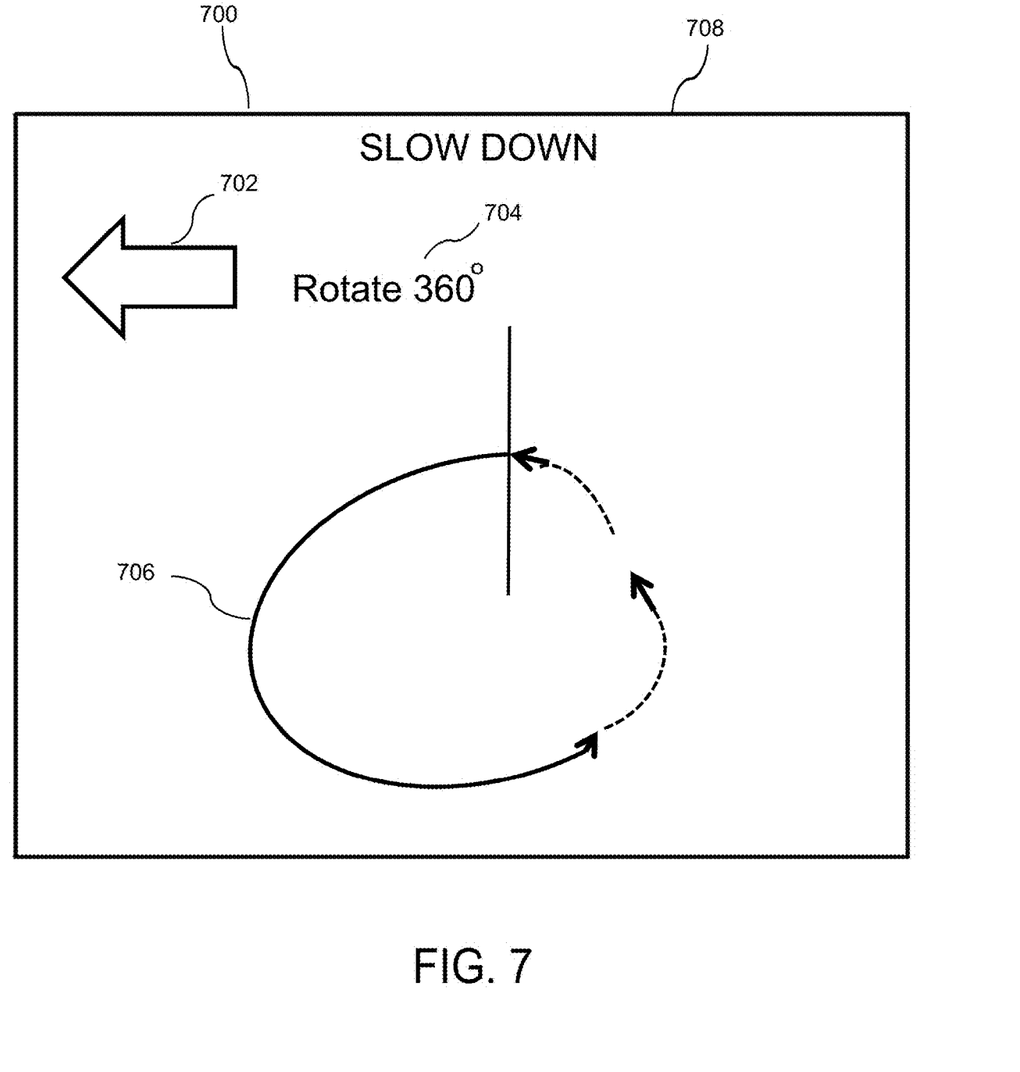
FIG. 7 depicts an exemplary graphical user interface (GUI), according to some embodiments of the disclosed invention.

FIG. 7 depicts an exemplary GUI 700, according to some embodiments of the disclosed invention. The user can activate a special "DF" mode for the MMT device, which causes the target to transmit signals as frequently as possible (e.g., one second intervals). The user interface then guides the user to slowly rotate all the way through 360 degrees by an indicator 704. An indicator 702 shows the user which direction to rotate to. If the user rotates too quickly, a command indicator 708 provide feedback to the user, for example "Slow Down" or "Speed Up." Another indicator 706 shows the status of the user's rotation in graphical format. A full circle indicates that the user has completed a 360 degrees rotation while a quarter circle indicates that the user has only rotated 90 degrees from the original position.

The MMT device (e.g., the processor 302 in FIG. 3) correlates the RSSI of the received signals to line of bearing of the target, and uses the higher number of samples to automatically calculate an estimated line of bearing to be used to locate the target transmitter. Once this measurement is complete, the target will be returned to its standard transmission interval, and the receiver's user interface returns to its normal "tracking" interface, with the exception that the target line of bearing is populated with a newly calculated line of bearing, in the above process. If an updated transmission including location data is received, the line of bearing is recalculated based on the received location data.

Figures 8A, 8B:
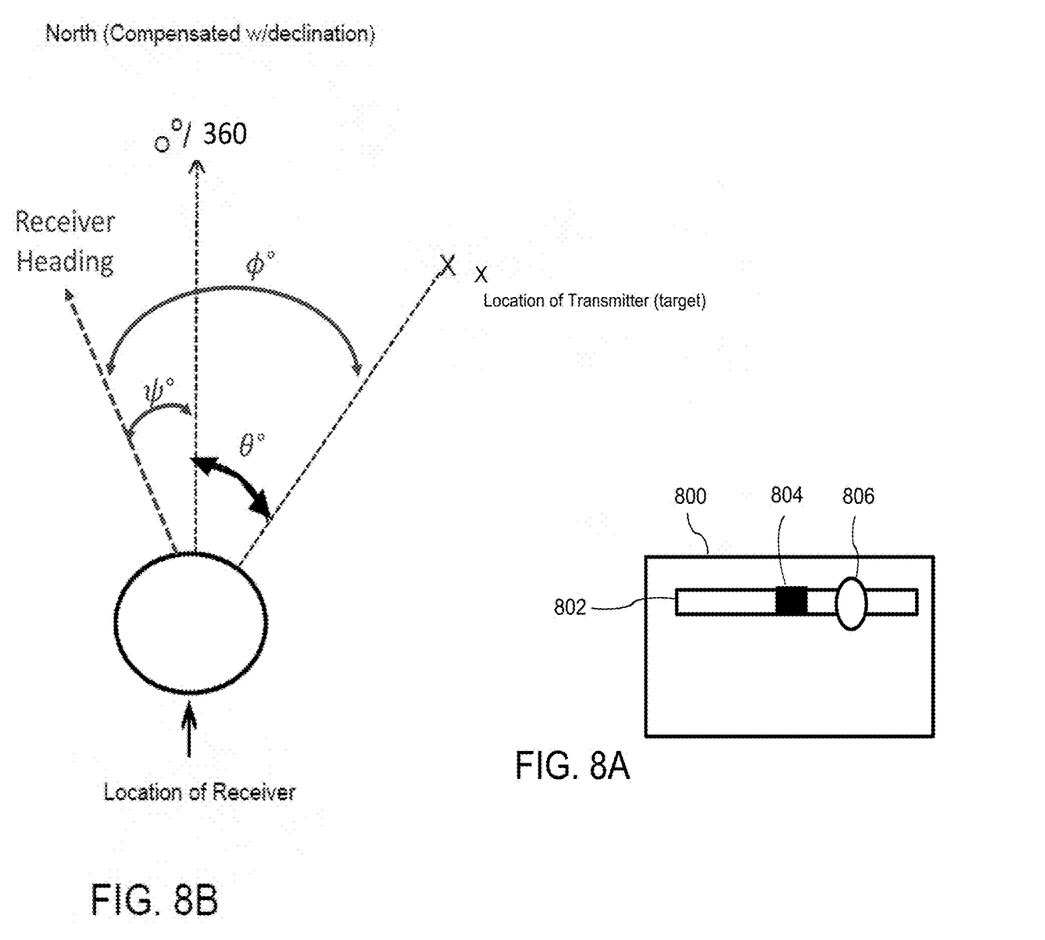
FIGS. 8A and 8B show an exemplary GUI for tracking a target when the target has a known location, according to some embodiments of the disclosed invention.

FIGS. 8A and 8B show an exemplary GUI for tracking a target when the target has a known location, for example, by a GPS or other location determining means, according to some embodiments of the disclosed invention. In some embodiments, when the target transmitter has a valid location, it sends it via the LOS link. The MMT receiver uses its own location and the target's location to calculate the correct line of bearing from the receiver to the target.

As shown in FIG. 8A, a navigation bar 802 on the GUI 800 directs the receiver to the correct line of bearing to the target. In some embodiments, the line of bearing to the target is calculated based on the headings depicted in FIG. 8B. The calculation for the receiver's bearing and the target's bearing can be in any order. In some embodiments, the receiver's bearing is calculated first, which is denoted by $\psi°$ in FIG. 8B. Next, the target's bearing is calculated, which is denoted by $\theta°$ in FIG. 8B. Finally, the target line of bearing (relative bearing between the user's heading and the target) can be calculated from the user's bearing and the target's bearing, which is denoted by $\phi°$ in FIG. 8B.

Referring back to FIG. 8A, an index line 804 in the center indicates the needed line of bearing to the target. A floating "bubble" 806 moves as a representation of the difference between the target line of bearing and the user's current heading. As the user heading changes, the bubble 806 moves to the right or left of the navigation bar 802. When the user gets the bubble 806 to be on top of the index line 804 by changing his/her direction, the user is on a correct target line of bearing and can be guided to the target. In some embodiments, the distance from the target is also calculated and displayed on the GUI to aid in locating the target. As new locations are received over the LOS, updates to target line of bearing and distance to target are updated, allowing tracking of a moving target.

This way, the disclosed invention allows both over-the-horizon communications with an operations center via satcom, while enabling team-members to communicate much more quickly via the RF LOS radio. Further, by adding a (e.g., 9-axis IMU) to the MMT devices, a user can direct team members to a member who is lost or under duress, using a simple interface on the device screen, or by providing "turn-by-turn" directions on a map via a Bluetooth tethered smartphone interface. In the event that the target device does not have GPS location, tracking team members can use body shielding direction finding with a historical display of the RSSI of the signal from the emitter, as explained above with respect to FIGS. 6, 7, and 8A.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A multimode tracking device comprising:
a line of site (LOS) antenna;
an LOS modem for communicating with other multimode tracking devices and for measuring power of a received signal, via the LOS antenna;
a satellite antenna;
a satellite modem for communicating with a satellite for receiving and sending text messages, data and commands to and from external devices including a tracking and locating (TTL) system, via the satellite antenna;
a Bluetooth or WiFi Direct interface for communicating with external mobile devices;
an inertia measurement unit (IMU) for providing motion tracking information;
a user interface including a display for interfacing with a user; and
a processor for generating and displaying a line of bearing to a target on the display, based on the measured power and the motion tracking information, wherein
the multimode tracking device tracks the target, including assets and personnel, using received data from the TTL system, and sends/receives text messages, data and commands to/from external devices both over the horizon (OTH) via the satellite, and locally via the LOS modem.

2. The multimode tracking device of claim 1, further comprising a plurality of sensors/beacons including radio frequency (RF) transceivers to act as a relay device for data transmission between the external devices.

3. The multimode tracking device of claim 1, further comprising a digital compass and a signal strength indicator, respective outputs of which are displayed on the display.

4. The multimode tracking device of claim 1, wherein the multimode tracking device communicates with mobile device applications via the Bluetooth or WiFi Direct interface.

5. The multimode tracking device of claim 1, wherein the satellite modem uses Iridium short burst data (SBD) for OTH communications and the LOS modem uses industrial, scientific and medical (ISM)-band radio for LOS communications.

6. The multimode tracking device of claim 1, wherein the LOS modem communicates with an unmanned aerial system (UAS).

7. The multimode tracking device of claim 6, wherein when there is an obstruction between the multimode tracking device and an external device, the multimode tracking device uses the UAS for communication with the external device.

8. The multimode tracking device of claim 1, wherein the multimode tracking device receives commands and configuration data for configuring the multimode tracking device, from the satellite via the satellite modem.

9. The multimode tracking device of claim 1, wherein the multimode tracking device receives commands and configuration data for configuring the multimode tracking device, from a mobile device via the Bluetooth or WiFi Direct interface.

10. The multimode tracking device of claim 1, wherein the multimode tracking device receives commands and configuration data for configuring the multimode tracking device, from other multimode tracking devices via the LOS interface.

11. The multimode tracking device of claim 1, further comprising a multi-global navigation satellite system (GNSS) for locational awareness.

12. The multimode tracking device of claim 1, wherein the processor correlates a received signal strength indicator (RSSI) of a received signal to the line of bearing of the target, and uses a higher number of samples to automatically calculate the line of bearing to be displayed and used to locate the target.

13. The multimode tracking device of claim 1, wherein the processor utilizes GPS coordinates from a received signal to generate the line of bearing to be displayed and used to locate the target.

* * * * *